Figure 1:
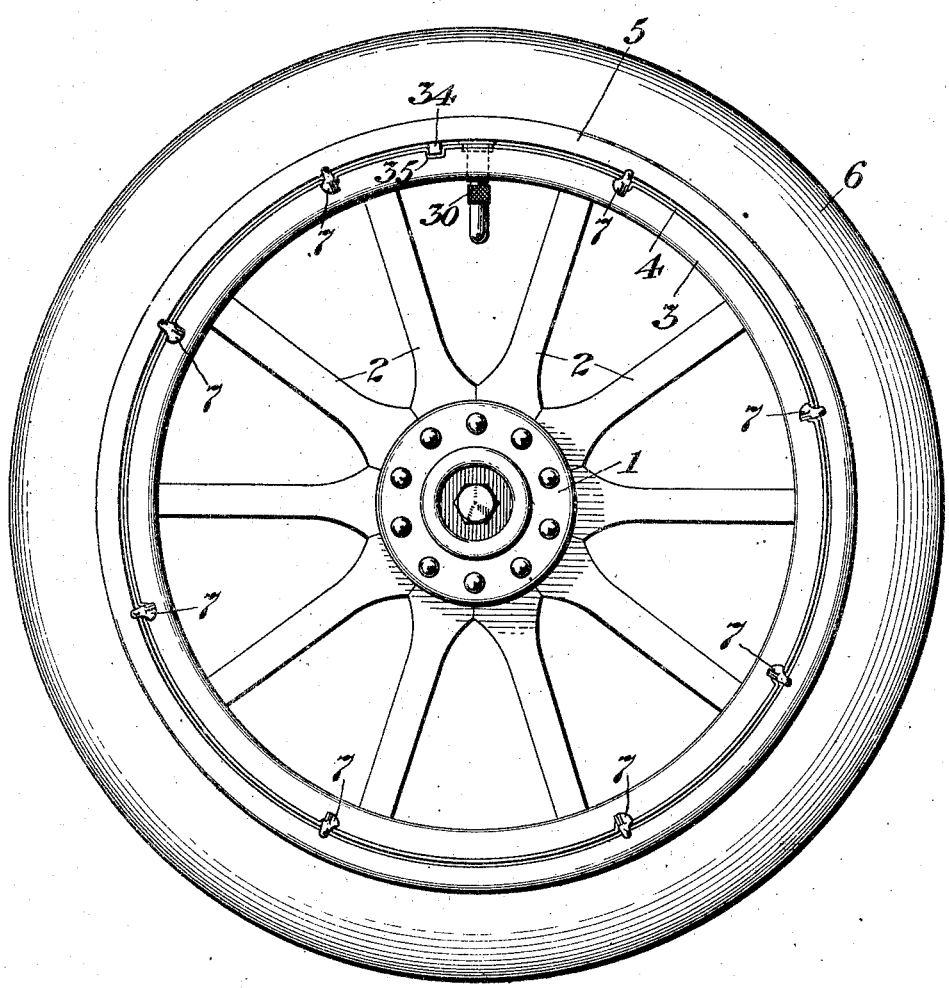

M. R. HUTCHISON.
DETACHABLE RIM FOR VEHICLE WHEELS.
APPLICATION FILED APR. 29, 1909. RENEWED JULY 20, 1912.

1,038,372.

Patented Sept. 10, 1912.
4 SHEETS—SHEET 1.

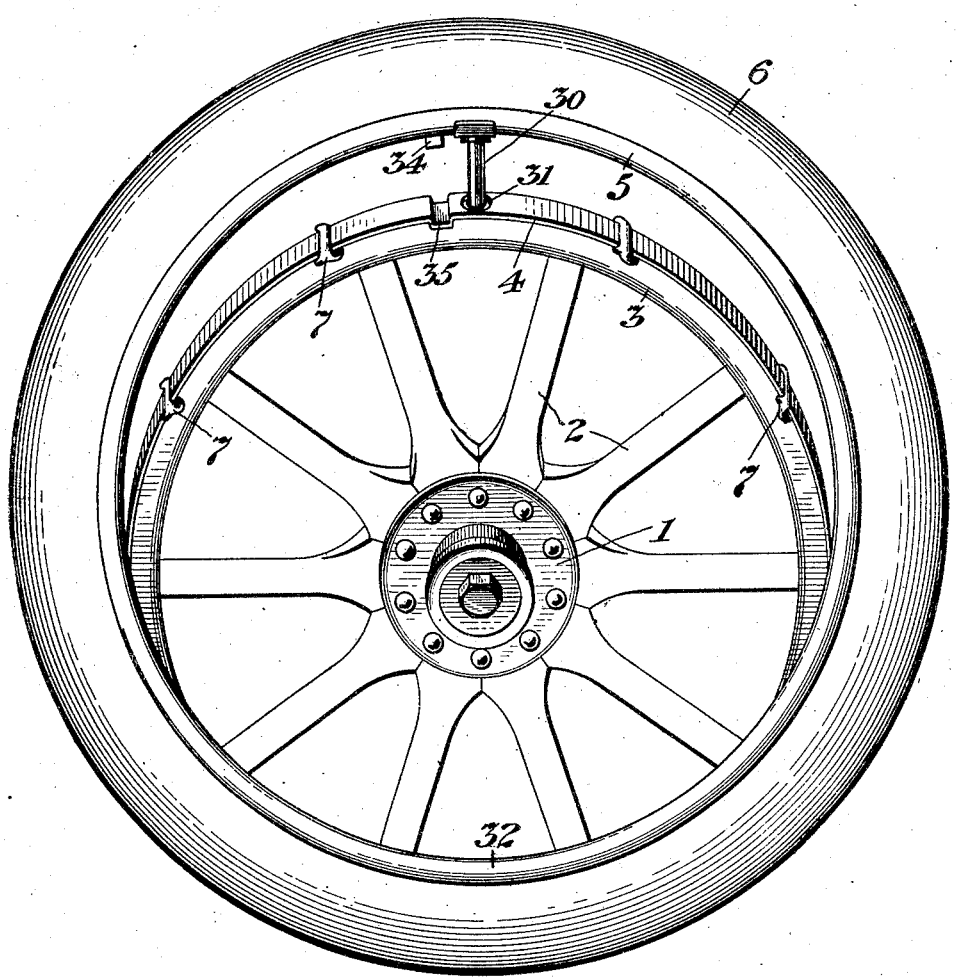

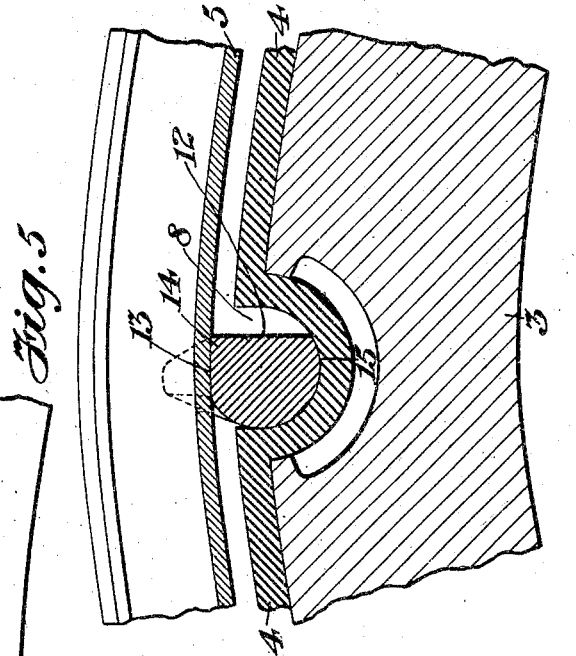
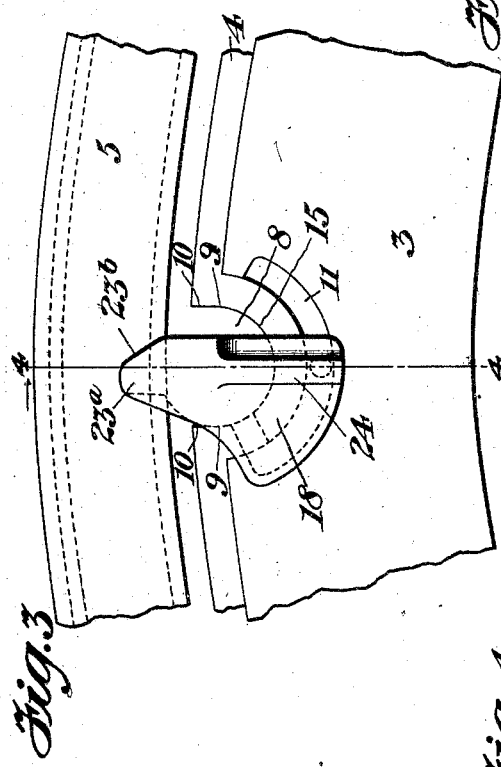
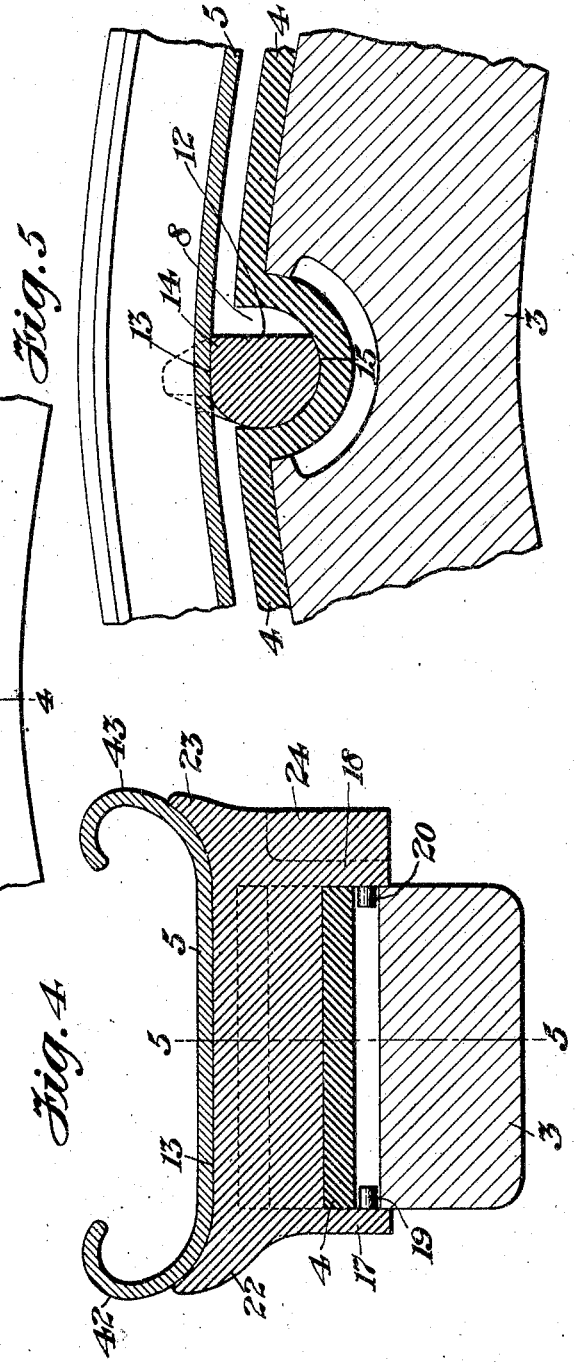

M. R. HUTCHISON.
DETACHABLE RIM FOR VEHICLE WHEELS.
APPLICATION FILED APR. 29, 1909. RENEWED JULY 20, 1912.
1,038,372.
Patented Sept. 10, 1912.
4 SHEETS—SHEET 4.
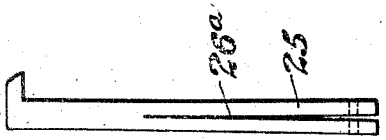
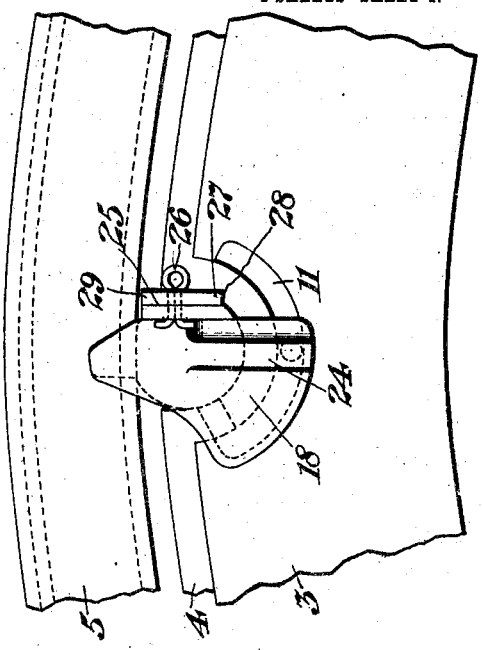
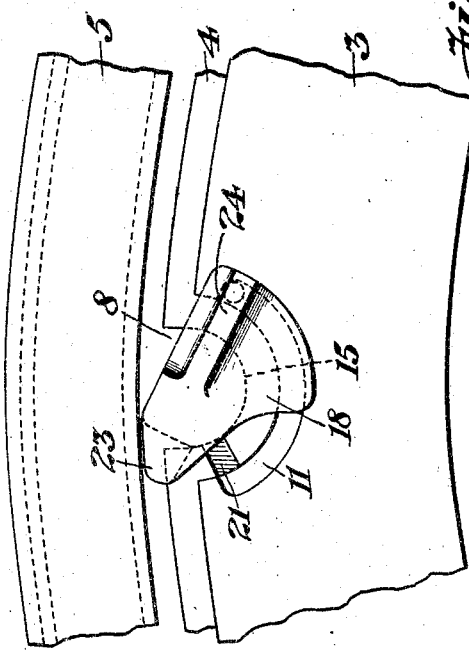
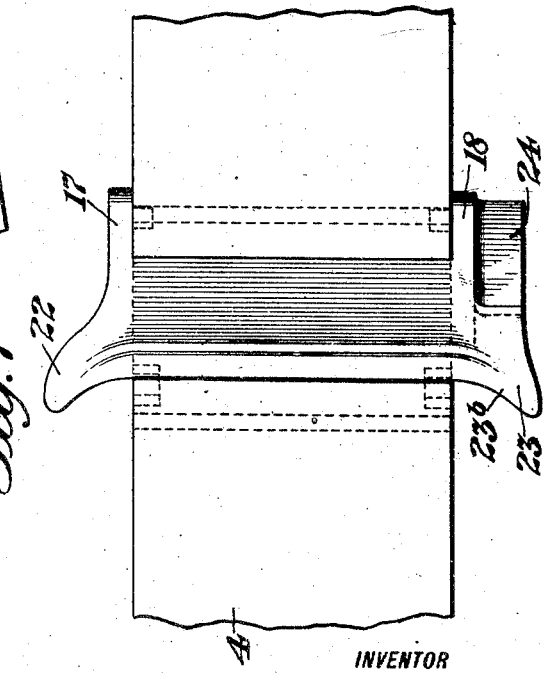
WITNESSES:
INVENTOR
Miller Reese Hutchison
BY
G. C. Dean ATTORNEY

UNITED STATES PATENT OFFICE.

MILLER REESE HUTCHISON, OF SUMMIT, NEW JERSEY.

DETACHABLE RIM FOR VEHICLE-WHEELS.

1,038,372.  Specification of Letters Patent.  Patented Sept. 10, 1912.

Application filed April 29, 1909, Serial No. 492,926. Renewed July 20, 1912. Serial No. 710,696.

*To all whom it may concern:*

Be it known that I, MILLER REESE HUTCHISON, a citizen of the United States, and a resident of Summit, in the county of Union and State of New Jersey, have invented certain new and useful Improvements in Detachable Rims for Vehicle-Wheels, of which the following is a specification.

My present invention relates to means for detachably securing a rim or tire to a wheel, and hence is especially applicable for use in connection with pneumatic tires used for automobiles and other vehicles, insomuch as this type of tire is peculiarly susceptible to puncture and blow out, yet is possessed of such inherent qualities and advantages that no satisfactory substitute has been found. Such tires are most universally used on passenger automobiles, used for business and pleasure purposes, where inconvenience and loss of time from tire trouble is particularly exasperating and moreover the passengers are usually of a class whose time is of considerable value in money or its equivalent.
For the above reasons, I have shown my invention applied for use in connection with pneumatic tires, although it may be obvious that other rims and tires may be detachably fitted in accordance with the invention herein disclosed.

One of the objects of the invention is to rigidly sustain the tire against radial thrust at a plurality of points suitably distributed about the periphery, and also to securely hold the rim in place against side thrust in either direction.

Another object of my invention is to supply the desired radial support by means not involving the use of nuts or screw threads, and which is otherwise free from liability to stick in case the parts rust, as is likely during prolonged use of one rim.

Another object of my invention is to have the devices for supporting the radial thrust normally secured in position on one of the members, preferably on the felly rather than on the rim, though the latter arrangement is possible and may be used.

Another desirable feature is to have the securing means arranged for detachable engagement, so that accidental displacement is unlikely, but intentional disengagement and removal is easy. One great advantage in having such members readily detachable is that in case of an emergency they may be removed and the vehicle driven home at reduced speed with only the steel face of the felly serving as a tire to protect the wheel. Preferably, also, said devices are formed and arranged for lateral engagement both with the rim and with the felly to lock the two together, so that side thrust applied to either is opposed by unitary resistance of both through the medium of the laterally disposed interlocking devices.

I prefer to make the interior diameter and shape of the detachable rim such that it does not snugly fit the exterior of the felly, because it is difficult and expensive to fit the rim accurately to the felly. Actual practice shows that in rims constructed on this principle, the rim is sometimes misshapen or slightly too small, or else it is too large, so as to permit of play, wear, and rattle of the parts in use. This difficulty may be obviated by making the rim somewhat larger than the felly—sufficiently to allow for ordinary inaccuracy of original workmanship and for slight deformations due to hard service. I prefer, however, to make the difference in diameter between rim and felly slightly greater than would be necessary for the above purposes, and, in practice, I determine this feature by the amount of clearance which will permit of seating the valve stem of the rim through its perforation in the felly, and then permit of swinging the diametrically opposite side of the rim into place on the felly on the arc of a circle, of which the valve stem is the center and the diameter of the wheel is the radius. The amount of clearance necessary for this purpose obviously depends upon the width of the felly and the width of the cylindrical inner bearing surface of the rim.

While the above is the preferred construction and arrangement, the lesser clearance first above described may be utilized, provided the felly be cut away so as to permit the valve stem to slide in place laterally, instead of being inserted endwise, as above described. The lateral cutting away of half the thickness of the felly to permit of insertion of the valve stem, reduces the effective strength of the entire wheel to that of this weak point in the felly.

I prefer to positively lock the rim circumferentially with respect to the felly, so as to prevent creeping, which might result in shearing the valve stem. Obviously, this may be effected by suitable construction of the dogs employed for radially and laterally locking the rim to the felly, but I prefer a simpler arrangement consisting of separate circumferential interlocking members on the rim and felly, respectively, said members being preferably arranged adjacent the valve stem.

The nature and objects of my invention will be further and more fully understood by the following description in connection with the accompanying drawings, wherein—

Figure 1 is a side elevation of a wheel of the automobile type with a rim and pneumatic tire secured in place thereon in accordance with my invention. Fig. 2 is a perspective view showing the manner of assembling the rim, valve stem, and wheel. Fig. 3 is an enlarged detail view showing a portion of felly, rim, and securing means. Fig. 4 is a vertical section on the line 4, 4, of Fig. 3. Fig. 5 is a vertical section on the line 5—5, of Fig. 4. Figs. 6 and 7 are respectively side and top plan views showing the interlocking dogs turned to the disengaging position, in order to permit application or removal of the rim. Fig. 8 is a view corresponding to Fig. 3, showing additional locking means which may be used to positively secure the lug against possibility of displacement. Fig. 9 is a detail view of the locking pin.

In Fig. 1 I have shown a wheel comprising a hub 1, spokes 2, and felly 3, of a type commonly employed for automobiles, the hub being of metal and the spokes and felly of wood. The latter is provided with a metal face 4, which, structurally considered, is part of the felly, but which, in emergency, may be used as a running tire. The rim 5 may be of any known or usual type and is shown as the ordinary, metal rim with inturned flanges commonly used with clencher tires. In Figs. 1 and 2 a pneumatic tire 6 is shown in position on the rim.

Distributed about the felly at suitable distances apart are the securing dogs 7, 7, 7, etc. The dogs extend across the felly and rim, preferably parallel with the axis of the wheel. They have a cross-section presenting greater diameter in one direction and a lesser diameter in another direction at an angle to said first mentioned direction. Preferably, the maximum and minimum diameters are 90 degrees apart circumferentially. The minimum diameter is preferably such that when this diameter is presented radially of the wheel, the rim will slide freely into place thereover, and the maximum diameter is preferably such that when the dog is rotated so as to present this diameter radially, the rim and felly will be positively and powerfully forced apart, the radial outward forcing by each dog on one side of the wheel being exactly counterbalanced by equal outward forcing action by the other dogs on the opposite side of the wheel. They are preferably arranged at diametrically opposite points. While circumferentially varying diameters may be utilized for this purpose and while the dog could be inserted between a steel felly 4, having a perfectly cylindrical periphery and a rim 5 having a cylindrical interior bearing surface, I prefer to arrange the dogs in suitable recesses in one of the members, preferably in the felly. Preferably, also, I arrange a special cylindrical bearing surface for the dog, so that all of the eccentricity, or difference in diameters, is brought into play and takes effect in outward forcing action upon the rim, without any displacement of the axis of rotation of the dog, either radial or circumferential. For this purpose, I provide the periphery of the wooden felly with a steel band formed with recesses 8 in its outer face, these recesses being preferably formed by bending or forging inwardly a full thickness of the material of the band. The bottom of the recess is preferably semicircular from point 9 on one side to point 9 on the other, the walls adjacent the opening between points 9 and 10 being preferably straight and parallel. The latter refinement of shape of recess 8 is not absolutely essential, but I find that the semicircular shape of the bearing surface is less apt to be distorted during the operation of shrinking the felly rim in place on the felly, if the semicircular portion commences at a point removed from the opening by about the thickness of the metal of the rim. In order to prevent distortion while the felly rim is being shrunk on the felly, it is desirable to use an exterior form or mold having radial metal lugs formed to fit the grooves 8 so as to hold them against distortion during shrinking. The wooden felly is cut away, as at 11, so as to provide a space between the wood of the felly and the bottom of the bent recesses 8, in the steel band 4, constituting the felly rim. This makes possible the use of felly rims of such irregular size as may occur in the regular stock in practical manufacture. The difference in sizes may be compensated for by forcing the recessed portions of the steel band more or less deeply into the recesses 11.

The rotary supporting dogs 7 are preferably formed of tough steel, drop forged to shape. The bearing 15 is circular and of a curvature adapted to fit the circularly curved bottom of the recess 8 in the steel felly rim 4. Another portion of the circumference is cut along relatively flat surfaces 12 and 13, in angular relation to each other, preferably at right angles, as shown. The surface 12 is cut nearer the axis of the dog and the surface 13 farther from the axis of the dog, so that when the latter is rotated to a position where the surface 12 is presented toward the tire, the radial projection of said surface 12 is less than the internal diameter of the tire rim 5, and when the dog is rotated so that the face 13 is presented toward the tire rim, the radial projection of the bearing surface in this position is greater than the normal internal diameter of the tire rim. In the latter position, the engaging portion of the tire rim 5 is powerfully forced outwardly, and thus put under very considerable elastic stress.

By inspection of Figs. 5 and 6, it will be seen that the angular corner of the rotary dog at 14 projects farther from the axis of the dog than either of the flat faces 12 or 13. Consequently, when the dog is rotated to the position shown in Fig. 5, it is held in position by the resilient elastic stress of the tire rim 5, and the corner 14 serves as a lock to hold the dog in place, insomuch as rotation of the dog backward from the position shown, requires forcing the tire rim still farther outward against increasing elastic stress before a position can be reached where the stress begins to decrease.

The rotary dog is held in place by depending flanges 17, 18, laterally engaging opposite sides of the felly rim and by pins 19, 20, projecting from opposite sides into the recess 11 under the circularly bent recess 8 in the wheel rim 4. The dogs are limited in their rocking movement in either direction by engagement of pins 19, 20, with one or the other of the ends of the recess 11. The dogs may be inserted in position or removed therefrom by turning to the position shown in Fig. 6, removing the tire rim, and then rocking back to the position where the pins 19, 20, register with the radial slot 21.

The tire rim 5 is preferably held against lateral thrust by outwardly and radially projecting brackets or horns 22. 23, which embrace and fit the curved contour adjacent the edges of the rim 5. These lateral brackets or horns turn down out of engagement with the sides of the tire rim when the dog is turned to the releasing position with the face 12 presented toward the rim.

By reference to Fig. 3, it will be seen that the horns or lateral engaging members 22, 23, have a relatively broad bearing on the rim at 23ª on one side of the line 4—4 which is perpendicular to the surface 13 and passes through the axis of rotation of the dog, but on the other side of said line they are cut away, as at 23ᵇ. This is necessary, because a bearing surface on the side 23ᵇ, would form a locking engagement of the dog with the rim, preventing turning to the releasing position. If the horn were not thus cut away at 23ᵇ, the locking action would be much like that of the corner 14, but might be greater than 14, because the arc of travel of the outermost portion of the horn is on a greater radius than the arc of travel of 14, and because the locking action would have a lateral component tending to pinch the tire rim.

By reference to Fig. 4, it will be seen that the horns 22, 23, are of such thickness as to lie behind the points of outermost projection of the tire rim at 42, 43, and hence are protected by these portions of the rim from violent contact with obstacles in the road. One or both ends of the dog may be provided with a flange 23 for engagement of a wrench to advantageously apply the power necessary to turn the dog to the clamping, locking position shown in Fig. 5, or to turn it back to the releasing position shown in Fig. 6.

If desired, supplemental means for locking the dog in the clamping position may be employed. As an illustration of such device, I have shown in Figs. 8 and 9 a key 25 split at the end, as at 26ª, so as to afford a spring bearing when the key is inserted between the flat side 12 of the dog and the side wall of the recess 8. It may be secured in position by means of a cotter pin 26, as indicated in Fig. 8. It will be noted that rotary displacement of the rotary clamping dog to the right, or in the direction of movement of the hands of a clock, is prevented by engagement of the square corner 27 of the pin 25 against the shoulder 28 which may be cut in the wall of the recess 8. Displacement in the opposite direction is prevented by engagement of corner 29 of pin 25 with the inner surface of the tire rim.

By reference to Fig. 2, it will be seen that a tire rim with ready inflated tire may be applied to the wheel by turning the dogs 7 to the position shown more clearly in Fig. 6. The valve stem 30 is then inserted in the perforation 31 in the felly, and is forced therethrough in a substantially radial direction, until the tire rim 5 takes bearing upon the felly rim 4. The diametrically opposite side 32 of the tire rim is then swung into the plane of the wheel and the tire rim is then locked in place by turning the dogs 7 successively to the positions shown in Fig. 1 and also more in detail in Fig. 5. Preferably, a projecting pin or transverse bar 34 is secured to the tire rim adjacent the valve stem and projects into engagement with a recess 35 in the felly rim 4.

It will be obvious that with my invention, a rim with a damaged tire may be removed and a perfect rim and tire applied in a minute or two, and that in an emergency, as where the supply of tire rims with inflated tires has been exhausted, or where the distance to be traveled is small, the dogs may be removed instantly and the vehicle driven at a reasonable speed upon the bare surface of the steel felly rim.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. A wheel and a detachable tire rim, in combination with securing means comprising a rotary dog formed with circular bearing surfaces and with flattened sides adapted to project different radial distances when the dog is in different positions of rotary adjustment, the radii of said flattened surfaces and their peripheral extent being proportioned to the radius and circumference of said circular bearing surfaces so that when one of said flattened surfaces is presented outwardly the rim may be applied to or removed from the wheel, when the other of said flattened surfaces is presented outwardly the rim is forcibly engaged and forced outwardly, and the radius of the cylindrical portion is too great to permit further rotation of the dog to present such cylindrical surface outwardly.

2. A wheel and a detachable tire rim in combination with a plurality of peripherally distributed intermediate rotary dogs having their axes parallel with the axis of the wheel, the side or peripheral surfaces of said dogs comprising a flat surface at such distance from the axis of the dog that when presented outwardly the rim may be applied or detached, another flat surface at a greater radial distance such that when presented outwardly the rim is forced outwardly and radially clamped, said side or peripheral surfaces of said dogs comprising also a circular bearing surface of greater radius than the first mentioned flattened surface.

3. A wheel and a detachable tire rim in combination with a plurality of peripherally distributed intermediate rotary dogs having their axes parallel with the axis of the wheel, the side or peripheral surfaces of said dogs comprising a flat surface at such distance from the axis of the dog that when presented outwardly the rim may be applied or detached, another flat surface at a greater radial distance such that when presented outwardly the rim is forced outwardly and radially clamped, said side or peripheral surfaces of said dogs comprising also a circular bearing surface of greater radius than either of said flattened surfaces.

4. A wheel and a detachable tire rim in combination with a plurality of peripherally distributed intermediate rotary dogs having their axes parallel with the axis of the wheel, the side or peripheral surfaces of said dogs comprising a flat surface at such distance from the axis of the dog that when presented outwardly the rim may be applied or detached, another flat surface at a greater radial distance such that when presented outwardly the rim is forced outwardly and radially clamped, said side or peripheral surfaces of said dogs comprising also a circular bearing surface of greater radius than any portion of either of said flattened surfaces.

5. A wheel and a detachable tire rim, in combination with securing means comprising a rotary dog formed with cylindrical bearing surfaces and with flattened sides having their minimum radii less than the radius of said cylindrical bearing surfaces, said radii of said flattened sides being proportioned so that the latter project different distances radially of the wheel when the dog is in different positions of rotary adjustment.

6. A wheel provided with recesses adjacent the periphery thereof, and a detachable tire rim, in combination with securing means comprising rotary dogs arranged in said recesses, each dog being formed with surface of small radius on one side to permit application and removal of the rim, and on another side, with bearing surfaces of greater diameter adapted to forcibly engage and radially support said rim, and with circular bearing surfaces of greater radius than the minimum radius of either of said bearing surfaces, the outer end of the dog being formed with brackets adapted to engage the rim laterally to prevent lateral displacement thereof.

7. A wheel provided with recesses adjacent the periphery thereof, and a detachable tire rim, in combination with securing means comprising rotary dogs arranged in said recesses, each dog being formed with a circular bearing surface, and with other surfaces at lesser distances from the axis of said bearing surfaces and having at each end thereof a lateral flange adapted to embrace the sides of the wheel and oppositely directed brackets or horns adapted to embrace the sides of the rim.

8. A wheel provided with a metallic felly rim formed with recessed bearing surfaces and a detachable tire rim of greater width than the wheel rim, in combination with securing means comprising rotary dogs arranged in said recesses, each dog being formed with circular bearing surfaces, and with other surfaces at different distances from the axis of said bearing surfaces, and having at each end thereof a lateral flange adapted to embrace the sides of the wheel and oppositely directed brackets or horns adapted to embrace the sides of the rim, each dog including its lateral flanges and brackets being of less total length than the width of said detachable rim.

9. A wheel and a detachable rim therefor in combination with rotary dogs having cylindrical bearing surfaces extending from side to side entirely across the width of the wheel rim and having a plurality of adjacent flattened surfaces of lesser radii, one of said surfaces being formed with outwardly curved extensions so as to afford a continuous clamping seat and lateral bearing entirely across the width of the detachable rim.

Signed at New York city, in the county of New York and State of New York, this twenty-eighth day of April, A. D., 1909.

MILLER REESE HUTCHISON.

Witnesses:
GEORGE C. DEAN,
IRVING M. OBRIGHT.